May 21, 1935.  H. E. IVES  2,002,090

MAKING PARALLAX PANORAMAGRAMS

Filed Dec. 20, 1930  2 Sheets—Sheet 1

INVENTOR
Herbert E. Ives
BY
Harry Leo Dodson
ATTORNEY

May 21, 1935.  H. E. IVES  2,002,090
MAKING PARALLAX PANORAMAGRAMS
Filed Dec. 20, 1930   2 Sheets-Sheet 2
Fig.4.
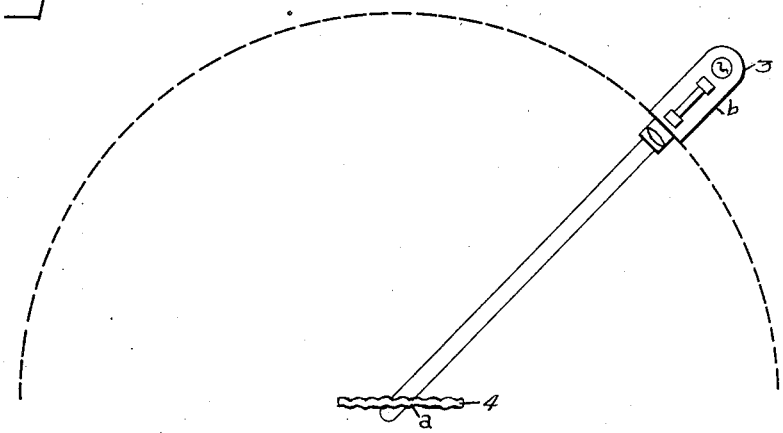
Fig.6.
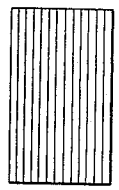
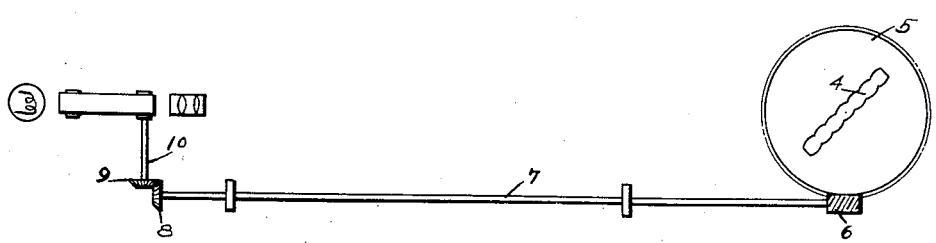
Fig.5.
INVENTOR
Herbert E. Ives
BY
Harry Lea Dodson
ATTORNEY Patented May 21, 1935

2,002,090

UNITED STATES PATENT OFFICE 2,002,090

MAKING PARALLAX PANORAMAGRAMS

Herbert E. Ives, Montclair, N. J., assignor to The Perser Corporation, New York, N. Y., a corporation of New York Application December 20, 1930, Serial No. 503,731

12 Claims. (Cl. 88—16.6)

Parallax panoramagrams (a term which I have employed to describe stereoscopic relief pictures) have heretofore been made only by procedures which involve an original exposure to the object through an opaque line grating or ridged structure closely in front of the photographic sensitive plate. These procedures permit finished pictures of only the original size or the original line spacing to be made by processes of contact printing. They require in general, an accurate registration of a viewing grating or ridged structure with the panoramic strip picture. This registration presents great practical difficulties, particularly where the photographic emulsion is placed upon a surface of cylindrical ridges in order to secure pictures of great depth of clear definition, as described in my Patent No. 1,918,-705, issued July 18, 1933.

My invention has for principal objects to provide a method of making parallax panoramagrams by which pictures of any size or fineness of strip structure may be obtained as the result of a single original exposure process, and also to provide a method by which the registration of the grating and strip picture may be done photographically.

The means which I use for attaining these objects consists in the use of a motion picture camera, moved laterally or in a circular arc, about the object to be photographed, and then projecting the pictures so made, by means of a motion picture projector, upon a photographic plate, placed behind a grating or ridged structure, the projector and photographic plate being given a relative lateral or circular motion. A further object is to carry out the same process of producing a parallax panoramagram, but by moving or rotating the object instead of the moving picture camera and projector.

My means of accomplishing these objects may be more readily comprehended by having reference to the accompanying drawings, which are herewith annexed and made part of this specification, in which—

Fig. 4 shows the means for printing parallax panoramagrams from the film exposed in the motion picture camera as illustrated in Figure 3, through a moving picture projector; and Fig. 5 shows the means for producing parallax panoramagrams by rotating the ridged sheet and photographic layer instead of swinging the motion picture projector in an arc.

Fig. 6 is a view of a line grating consisting of a series of alternate, opaque and transparent lines.

Figure 1:
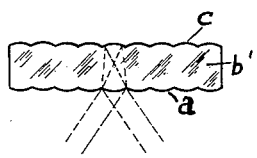
Fig. 1 is a sectional view of a structure for producing parallax panoramagrams for viewing by reflected light in which small $a$ indicates the cylindrical ridges; small $b'$ the transparent base; and small $c$, the cylindrical ridges coated with photographic emulsion.

In Figure 1 I have shown a structure by which a parallax panoramagram can be made which will have sufficient illumination by reflected light without the use of the opaque lined grating used in my prior patent. It consists of a transparent refracting medium, provided on its front and back faces with opposed cylindrical ridges, of such curvature that the front ridges focus parallel rays incident in any direction sharply upon the rear ridge surface, as shown by the ray paths indicated by the dotted lines. If then the rear surface is coated with a diffusely reflecting material, such as white paint, any linear element of a rear ridge (perpendicular to the plane of the paper in the figure) will be illuminated only by light striking the front in a narrow sheet at a definite angle to the normal, and the diffuse reflection will be visible only at the same angle, since the rays simply retrace their paths (except for diffusion upward and downward). All of the incident light is returned (except for absorption losses), whereby the chief fault of the opaque line grating structure, if used for reflected light, is obviated.

Let us now suppose that the coating on the rear ridges is a photographic emulsion, and that it has impressed upon it the linear elements of a parallax panoramagram, leaving aside for the present the question of how to produce such a pictorial record. Suppose that this photographic record is backed by a white diffusing paint and that it is developed only to a low density, so that after the incident light passes twice through the picture the correct contrast is exhibited. We would then have a parallax panoramagram or relief picture, visible by reflected light, adequately bright for satisfactory observation.

Figure 2:
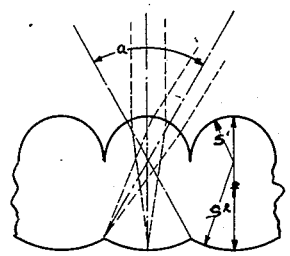
Fig. 2 is an enlarged fragmentary sectional view showing the exact form of the ridge structure for parallax panoramagrams.

The problem of producing a transparent ridged base of the sort shown in section in Fig. 1 (using celluloid as the material) and of coating it with a photographic emulsion, is one which has already been practically solved in another realm, namely: that of color photography by the process which utilizes a lenticular or so-called "Goffered film" (French Patent #466,781, U. S. Patent #1,214,552, A. Keller-Dorian). The outstanding problem is the method of impressing the photographic strip images upon the back surface ridges. Contact printing from a flat negative produced in the usual way through a line grating is not feasible because of the extreme difficulty of securing exact registration of the linear structures of negative and print, especially if the latter is upon a material such as celluloid, which is susceptible of distortion. Nor would this procedure, even if practicable, be desirable for, as is discussed below, the ridged structure, if properly utilized, makes possible relief pictures superior to any made upon flat surfaces. It is accordingly necessary to develop some scheme for forming the minute panoramic strips upon each ridge, and this scheme must, if it is to be practical, permit of the making of multiple copies. The character of the rigid structure shown in Figure 2 may be described in more detail. If the front cylindrical ridges are made with a radius of curvature $s_1$, and the medium has a refractive index $n$, simple lens theory gives for the thickness, assuming the rays outside the medium to be parallel, $f = s_1(N/n-1)$. The radius of curvature of the rear cylindrical ridges will be $f - s_1 = s_1/n - 1$, the front and rear ridges having the same axis. For a refractive index of 1.5, the thickness will be three times, and the rear cylinder radius twice the front cylinder radius. The angle $\alpha$ between the axes of the extreme bundles of rays focussed on the rear cylinder determines the angle through which the relief picture will be visible, when the entire rear ridge is impressed with an appropriate panoramic view. For the case of a medium of refractive index 1.5, the angle $\alpha$ is 60°.

Figure 3:
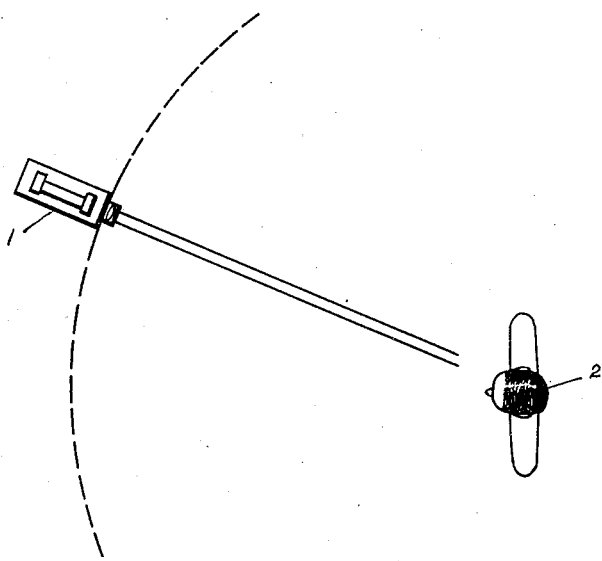
Fig. 3 shows the means employed for making the negative for parallax panoramagrams, where the motion picture camera is moved through an arc around the object to be photographed.

The method which is the subject of this application, is characterized by the fact that the original negative from the object is made without the intermediation of any line grating or other structure. The principle involved is easily grasped when it is pointed out that fundamentally what we require in a parallax panoramagram is an infinite series of pictures, each taken from a different angle. At first sight it might seem that to obtain and utilize such an infinity of views would be physically impractical. While, of course, a battery of closely juxtaposed cameras arranged in an arc about the object could be set up for making a large number of negatives; and a similar battery disposed for projecting superposed images from these negatives for printing, the problems of registration encountered would be such as to make the procedure very cumbersome and unsatisfactory. But we have available, from another development in applied optics, namely the motion picture, just the apparatus necessary for producing large numbers of pictures which may be as little different from one another in point of view as we choose,—provided we have sufficient time at our disposal in our photography of the original object. The problem of producing a series of many pictures, each displaced from its neighbor in point of view by an infinitesimal angle is solved,—and this is the essential feature of my invention—by taking a regular motion picture film of the object with a motion picture camera which is given a slow continuous lateral movement during the exposure. If, for instance, as shown in Fig. 3, the camera 1 is pivoted in the vertical axis through the object 2, and is moved through the entire semi-circular arc in front of the object in one minute, the strip of motion picture film exposed during this time will contain, at a normal taking rate, about 1500 separate views, an ample number to be considered "infinite" for our purpose. If a positive from this film is projected (as shown in Figure 4) upon a screen in the normal manner from a projector 3 mounted on a base $b$ which is fixed in position, it will exhibit the object as apparently slowly rotating about a vertical axis. If the projector 3 is moved along an arc similar to that described by the camera, and the observer moves with the projector, he will see the object depicted as it would have been seen from the same relative positions of camera and object as those occupied by projector and screen.

In order to produce parallax panoramagrams from this motion picture film, it is clear that we have merely to substitute for the screen (not shown) in the case just considered a photographic plate slightly behind a grating or an unexposed emulsion coated ridged sheet 4 of the sort shown in Fig. 1. Using the negative film, obtained by the procedure shown in Fig. 3, it is evident that after completion of the passage of the projector 3 along the arc whose center is a grating and plate or the ridged sheet 4, a positive parallax panoramagram will be obtained upon completing the photographic development.

The apparatus for making parallax panoramagrams from the master motion picture film may be considerably simplified by virtue of the fact that relative rotation of the ridged sheet with respect to the projector is much easier to provide mechanically if the projector is kept stationary and the ridged sheet rotated. A schematic arrangement for achieving this is shown in Fig. 5 where the ridged structure 4 is mounted on a turntable 5, which may be driven by a worm 6 mounted upon a rod 7, which in turn is rotated by a pair of mitre gears 8 and 9, the gear 9 being mounted upon a shaft 10 driven by the mechanism employed for running the film through the stationary projector and rotated concurrently therewith. (This arrangement could of course, be used also in taking the master film, provided the object photographed is small enough and otherwise adapted to be carried easily on a turntable.) This simplification is of very real value in making the prints from the film, since the film must be run through for each print, and any superfluous mechanical parts, subject to wear and tear, are to be avoided.

A feature of the method using the motion picture film negative which is of practical value, is that it permits parallax panoramagrams to be made of any size or of any grating space from the original negative, which is not the case where the first exposure is made, as is usual, through a grating. An advantage due to the fact that the picture strips are automatically made of the right size and in register with the grating or ridged structure, is that the panoramagram can be made in a light non-fragile form, by substituting a celluloid sheet with grating lines on one side and photographic emulsion on the other for the heavy, double glass structure heretofore necessary. Even better, however, as a transparency is the relief picture obtained by using the double-ridged sheet described for viewing by transmitted light. As already mentioned, this has greater depth of clear definition than the opaque line grating form.

In Figs. 3, 4 and 5, the motion picture camera and projector are shown as having relatively circular motion with respect to the object or photographic plate. This form of motion, while usually most convenient, may have substituted for it a straight relatively lateral motion provided the lenses used are of sufficiently wide angle.

The process as described covers the production of a positive parallax panoramagram from a motion picture film negative, and necessitates running through the motion picture film for each positive obtained. In certain cases it may prove advantageous to use a positive motion picture film, whereby a parallax panoramagram negative is obtained by the procedure described. This negative may then be used for making any number of contact prints suitable for mounting with opaque line gratings or ridged sheets.

Having described my invention, what I regard as new and desire to secure by Letters Patent is:

1. The method of producing parallax panoramagrams comprising the following steps; exposing in a moving picture camera a sensitized surface and at the same time causing relative lateral movement between the moving picture camera and the object being photographed, projecting from a moving picture projector the pictures thus made onto an unexposed emulsion coated ridged sheet, and at the same time causing relative lateral movement between the projector and said ridged sheet.

2. The method of producing parallax panoramagrams comprising the following steps; exposing in a moving picture camera a sensitized surface and at the same time moving the camera in an arc about the object being photographed, projecting from a moving picture projector the pictures thus made onto an unexposed emulsion coated ridged sheet, and at the same time moving the projector in an arc about the ridged sheet.

3. The method of producing parallax panoramagrams comprising the following steps; exposing in a moving picture camera a sensitized surface and at the same time rotating the object being photographed, projecting from a moving picture projector the pictures thus made onto an unexposed emulsion coated ridged sheet, and at the same time rotating the ridged sheet.

4. The method of producing parallax panoramagrams comprising the following steps; exposing in a moving picture camera a sensitized surface and at the same time causing relative lateral movement between the moving picture camera and the object being photographed, projecting from a moving picture projector pictures thus made onto a photographic plate located a short distance behind an opaque line grating and at the same time causing relative lateral movement between the projector, the grating and said plate.

5. The method of producing parallax panoramagrams comprising the following steps; exposing in a moving picture camera a sensitized surface, at the same time moving the camera in an arc about the object being photographed, projecting from a moving picture projector the pictures thus made onto a photographic plate located a short distance behind an opaque line grating and at the same time moving the projector in an arc about the photographic plate.

6. The method of producing parallax panoramagrams comprising the following steps; exposing in a moving picture camera, a sensitized surface, at the same time moving the camera in an arc about the object being photographed, projecting from a moving picture projector the pictures thus made onto a photographic plate located a short distance behind an opaque line grating, and at the same time rotating the said plate and grating.

7. The process of producing parallax panoramagram negatives comprising the following steps; exposing in a motion picture camera a sensitized surface, at the same time giving relative motion to the camera and the object being photographed, making a positive print from the negative so obtained, projecting this positive print from a motion picture projector upon an unexposed sensitive plate behind an opaque line grating at the same time giving relative motion to the projector, the grating and sensitive plate.

8. The process of producing parallax panoramagram negatives comprising the following steps; exposing in a motion picture camera a sensitized surface, at the same time giving relative motion to the camera and the object being photographed, making a positive print from the negative so obtained, projecting this positive print from a motion picture projector upon an unexposed emulsion coated ridged sheet, at the same time giving relative motion to the projector and the ridged sheet.

9. The method of producing parallax panoramagrams comprising the following steps; exposing in a moving picture camera, a sensitized surface, at the same time causing relative lateral movement between the motion picture camera and the object to be photographed, projecting from a moving picture projector the picture thus made onto an unexposed emulsion coated ridged sheet and at the same time rotating the ridged sheet.

10. The method of producing parallax panoramagrams comprising the following steps, exposing in a moving picture camera a sensitized surface, at the same time moving the camera in an arc about the object being photographed, projecting from a stationary moving picture projector the pictures thus made onto an unexposed emulsion coated ridged sheet, and at the same time rotating the ridged sheet.

11. The method of producing parallax panoramagrams comprising the following steps, exposing in a moving picture camera a sensitized surface. at the same time rotating the object being photographed, projecting from a moving picture projector the pictures thus made onto an unexposed emulsion coated ridged sheet and at the same time causing relative lateral movement between the moving picture projector and the ridged sheet.

12. The method of producing parallax panoramagrams comprising the following steps, exposing in a moving picture camera a sensitized surface, at the same time rotating the camera in an arc about the object being photographed, projecting from a moving picture projector the picture thus made onto an unexposed emulsion coated ridged sheet and at the same time causing relative lateral movement between the projector and said sheet.

HERBERT E. IVES.